United States Patent [19]

Bauer

[11] Patent Number: 5,446,666
[45] Date of Patent: Aug. 29, 1995

[54] GROUND STATE-FLY STATE TRANSITION CONTROL FOR UNIQUE-TRIM AIRCRAFT FLIGHT CONTROL SYSTEM

[75] Inventor: Carl J. Bauer, Glassboro, N.J.

[73] Assignee: The Boeing Company, Seattle, Wash.

[21] Appl. No.: 243,796

[22] Filed: May 17, 1994

[51] Int. Cl.$^6$ .............. B64C 9/00; B60V 3/08
[52] U.S. Cl. .............. 364/434; 364/424.06; 364/427; 364/428; 244/178; 244/100 R
[58] Field of Search ......... 364/434, 433, 567, 424.02, 364/424.06, 427, 428; 244/17.13, 17.17, 175, 177, 178, 100 R, 193; 180/119, 121; 318/583, 616, 617, 618

[56] References Cited

U.S. PATENT DOCUMENTS

| | | | |
|---|---|---|---|
| 4,077,589 | 3/1978 | Belolipetsky et al. | 244/100 A |
| 4,330,829 | 5/1982 | Fischer et al. | 364/434 |
| 4,373,184 | 2/1983 | Lambregts | 364/434 |
| 4,378,518 | 3/1983 | Nixon | 244/180 |
| 4,385,355 | 5/1983 | Verzella et al. | 364/434 |
| 4,420,808 | 12/1983 | Diamond et al. | 364/434 |
| 4,507,742 | 3/1985 | Bateman | 364/567 |
| 4,714,929 | 12/1987 | Davidson | 342/439 |
| 4,769,759 | 9/1988 | McGough | 364/435 |
| 4,786,014 | 11/1988 | Pesando et al. | 244/115 |
| 4,869,444 | 9/1989 | Ralph | 244/104 FP |
| 4,953,098 | 8/1990 | Fischer, Jr. et al. | 364/508 |
| 4,965,879 | 10/1990 | Fischer, Jr. | 364/424.01 |
| 4,980,684 | 12/1990 | Paterson et al. | 340/970 |
| 5,008,825 | 4/1991 | Nadkarni et al. | 364/434 |
| 5,113,346 | 5/1992 | Orgun et al. | 364/428 |
| 5,141,177 | 8/1992 | Wright et al. | 244/17.13 |
| 5,209,431 | 5/1993 | Bernard et al. | 244/17.17 |
| 5,301,112 | 4/1994 | Gold et al. | 364/434 |

Primary Examiner—Kevin J. Teska
Assistant Examiner—Tan Nguyen
Attorney, Agent, or Firm—Jones, Tullar & Cooper

[57] ABSTRACT

An aircraft control system for an unique-trim, model-following system includes a feedforward shaping function that provides quickening of pilot input, and an automatic trim function that accommodates return of the cockpit controller to an unique, centered position during trimmed flight. The basic control law is reconfigured in response to the changing state of landing gear contact to support transitions between ground state and fly state conditions. The state of the landing gear is monitored continually to recognize the occurrence of initial ground contact and whether the aircraft is constrained about a rotational axis due to ground contact. The control is altered progressively as the transition proceeds so that command of the control surface is consistent with the degree of constraint imposed by ground contact.

13 Claims, 3 Drawing Sheets

GROUND STATE-FLY STATE TRANSITION CONTROL FOR UNIQUE-TRIM AIRCRAFT FLIGHT CONTROL SYSTEM

This invention was conceived or developed in the course of work under U.S. government contract No. DAAJ09-91-C-A004.

BACKGROUND OF THE INVENTION

1. Field of the Invention

This invention relates to the field of aircraft flight control systems. More particularly, it pertains to a system for trimming control surfaces during transitions between conditions when the craft is airborne and when its landing gear are firmly in ground contact.

2. Prior Art

The main rotor of a helicopter rotatably supports blades having an airfoil shape, which produce aerodynamic lift or thrust as the blades pass through the air. A pitch link attached to each blade changes the angle of attack by applying control force to the blade and rotating it about its pitch axis, thereby affecting the magnitude of lift produced by the rotor. The opposite end of each pitch link is connected to a rotating swashplate, which is connected to a stationary, nonrotating ring located below the rotating ring by bearings, which allow relative rotation of the rings and hold them at the same angle and relative axial position along the rotor shaft. The stationary ring can be raised and lowered along the axis of the rotor shaft, or tilted with respect to that axis by action of control servos or actuators, a longitudinal servo and multiple lateral servos.

To change the angular position of rotor lift, the pitch of each blade is changed individually, i.e., cyclic pitch is applied by causing the longitudinal servo to tilt the rings and main rotor about the rotor shaft. To change the magnitude of rotor lift, the pitch of all blades is changed concurrently by raising the rings along the rotor shaft by the same amount, i.e., collective pitch is applied by causing the lateral servos to raise the rings relative to the main rotor.

To prevent a single rotor helicopter from rotating continually about its rotor axis, a tail rotor is used to produce a thrust force directed laterally that compensates for main rotor torque. This stabilizes the yaw heading and attitude of the aircraft against wind gusts and changes in main rotor torque. By overcompensating and undercompensating for these transients, the pilot changes the angular position of the aircraft about the yaw axis.

The magnitude of the tail rotor thrust varies with changes in pitch or angle of attack of the tail rotor blades resulting from raising and lowering a rotating swashplate connected by pitch links to the blades. The position of the swashplate is changed while maintaining its angular position constant so that tail rotor blade pitch changes collectively. Conventionally, the tail rotor thrust is controlled by pilot manipulation of control pedals connected by cables, bellcranks and push-pull rods to the tail rotor controls.

Fixed wing and rotary wing aircraft flight control systems include mechanical linkages between the cockpit controls (such as a center stick, pedals or control wheel) and the control surfaces (such an aileron, elevator or rudder for fixed wing aircraft, or longitudinal cyclic pitch, lateral cyclic pitch, main rotor collective pitch and tail rotor collective pitch for a helicopter).

More recently, fly-by-wire aircraft controls systems, which usually employ complex stability augmentation systems to significantly reduce pilot workload, have become increasingly prominent. In fly-by-wire systems the mechanical links between the cockpit control and control surfaces may be replaced with electronic systems including sensors, logic and actuators.

Although fly-by-wire flight control systems offer significant improvement over conventional control systems, they present design challenges. Control law architecture and level stability augmentation, which are optimized for in-flight modes of operation, may not be appropriate for air-to-ground and ground-to-air transitions. Therefore, a complete and comprehensive design solution should include a flight control law that specifically accommodates these transitions.

Conventional helicopter flight control systems employ a displacement cockpit controller, such as a center stick, whose position provides an indication to the pilot of the angular disposition or attitude of the rotor. With a displacement controller, there is full correlation between the position of the controller and control surface command. A unique-trim controller does not produce a fixed amount of output for a given pilot input; instead the controller integrates the input over time and produces an output that is a combination of controller displacement and the length of the period of its displacement. Therefore, the direct correlation between controller position and control surface command that is present with a displacement controller is absent with a unique-trim controller.

Rotational constraint of the aircraft about reference coordinate axes due to ground contact impairs the pilot's awareness of control surface command, particularly where a unique-trim controller is employed. A comprehensive solution should resolve this difficulty also.

SUMMARY OF THE INVENTION

An object of the control system of this invention is to transition between two distinctly separate flight regimes, flight state and ground state, so that the value of a dynamic aircraft variable, such as attitude with respect to the pitch and roll axes, heading with respect to the yaw axis, and altitude with respect to the lift axis, is controlled in a predictable manner.

To avoid the difficulties and other shortcomings of prior art techniques for controlling aircraft maneuvers, a helicopter flight control has been developed to accommodate ground-to-air and air-to-ground transitions. The control is particularly appropriate and especially suited for use with a unique-trim, model-following aircraft control systems. In a model-following control system, the response of the aircraft to control system input is determined and then modeled mathematically. The model is incorporated in the flight control system, which produces output in response to pilot input and causes the aircraft to respond in accordance with the model.

The present invention provides several improvements over the prior art. Feedforward shaping is smoothly transitioned on the basis of information indicating whether the landing gear are contacting ground, provided by switches or other sensors mounted on each of the landing gear. The system that controls the transition insures that the frequency response profile of the feedforward shaping function during the transition is bounded by the fly state and ground state profiles, i.e., the end points of these states.

A control according to the present invention involves use of specific combinations of landing gear sensor feedback to change the architecture of the control law throughout the fly-ground state transition. The control transitions a particular axis of the rotor control system to a ground state control law when the corresponding axis of the aircraft becomes constrained by ground contact. The control of this invention functions as an unique-trim system in flight and as a displacement control system on ground. In flight, the controller always returns to a unique, centered position during trimmed flight conditions. On ground, the controller detent position is referenced to a control surface neutral position, such as the flat rotor position.

In realizing these advantages and objectives the control system of this invention includes a unique-trim controller that produces control input representing a desired value of an aircraft variable, and sensors that respond to the loaded and unloaded condition of the landing gear and produce signals representing whether each landing gear contacts ground. Landing gear ground contact logic responds to the sensor signals and producing signals indicating whether the aircraft is operating in the fly state or ground state. A feedforward shaping function, which responds to landing gear ground contact signals and the control input, develops a feedforward command that changes gradually during the transition between the fly state and ground state as a function of the magnitude of a transition variable. The feedforward command has the frequency response of a lead/lag filter in the fly state, a response that is independent of frequency in the ground state, and a frequency response that changes with the transition variable magnitude during the transition between these states. A summing junction combines the feedforward command and a trim command, and produces a control surface command, which is used to operate the aircraft control surfaces.

An automatic trim function produces a trim command, removes the effect of steady-state control input from the control surface command when operating in the fly state, and produces a control surface neutral position command during operation in the ground state with all landing gear in ground contact.

DESCRIPTION OF THE PREFERRED EMBODIMENT

Figure 1:
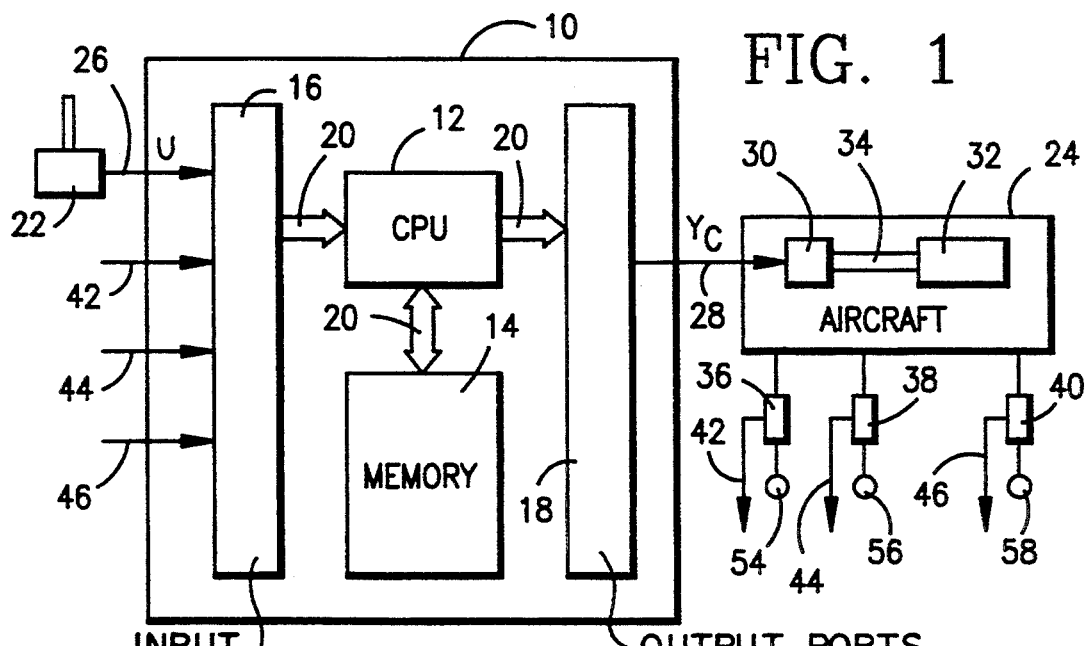
FIG. 1 is a schematic diagram showing a control system according to this invention applied for use with a microprocessor to the control surfaces of an aircraft.

The flight control system of this invention, arranged as shown in FIG. 1, can be carried out using an electronic microprocessor 10 having an integrated central processing unit CPU 12; electronic memory 14 including read-only memory ROM, in which data and algorithms for controlling the aircraft control surfaces are stored permanently; read-write memory RAM, where data read from various sensors are updated and stored for use during execution of the algorithms; input ports 16, including signal conditioning circuits for converting analog output from various sensors to digital form for processing, connect the microprocessor to those sensors; output ports 18, including driver circuits for converting digital output of the processor to voltage and current supplied to actuators that operate the control surfaces, connect the processor to those actuators; and an address/data bus 20, on which digital communication among the CPU, memory and I/O ports is carried.

A unique-trim controller 22, located in the cockpit of the aircraft 24 and operated manually by the pilot, is connected by line 26 to the processor 10 through an input port, on which line a command signal U is generated by the pilot applying force to the controller in the direction of the desired aircraft variables, e.g., roll, pitch, yaw or lift axis. The control system is described with reference to the position and rate of change of a single unique-trim controller 22, whose position and displacement rate correspond to commands intended to alter the attitude and disposition of the rotors and to change the magnitude of lift produced by the rotors. Control system output signal $Y_C$, carried on line 28, is directed to actuators 30, which manipulate the aircraft control surfaces 32 that produce changes of aircraft attitude and position with respect to roll, pitch, and yaw axes. In a helicopter, these actuators produce changes in hydraulic, electrical or mechanical actuation systems 34 that alter the magnitude of main rotor collective pitch, lateral cyclic pitch, longitudinal cyclic pitch, and tail rotor collective pitch. In a fixed wing aircraft, the actuators manipulate control surfaces such as a rudder, elevators, and ailerons, in response to movement of the unique trim controller.

Figure 3:
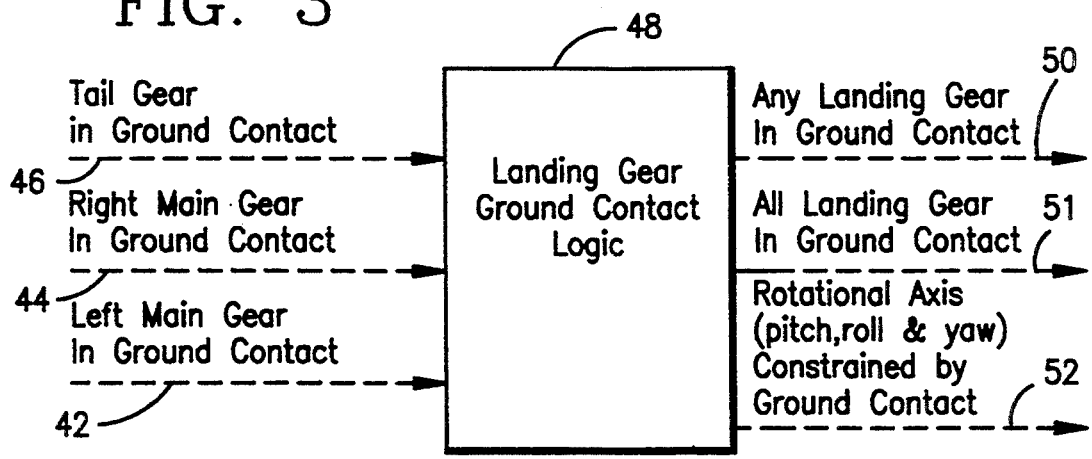
FIG. 3 is a schematic representation of logic that processes landing gear information and produces signals used by the control.

The aircraft is supported on front and rear landing gear each having ground contact sensors 36, 38, 40, in the form of electric switches, whose states are determined by the loaded-and unloaded condition of each landing gear. Preferably these sensors are able to sense reliably a ground reaction force of less than about ten percent of the aircraft gross weight. Signals representing whether the respective landing gear is in ground contact are carried on lines 42, 44, 46 to input ports 16. As shown in FIG. 3, the signals on lines 42, 44, 46 are processed by landing gear ground contact logic 48, which may be a software module called from permanent memory as required during execution of the algorithms to produce a signal 50 indicating that any landing gear is contacting ground, signal 51 indicating that all landing gear are contacting ground, and signals 52 indicating whether a rotational axis (roll, pitch and yaw) is constrained by ground contact and which axis is constrained.

Whether a rotational axis is constrained by ground contact depends on the configuration of the landing gear. For example, an aircraft having right-hand and left-hand front landing gear 54, 56 and a tail wheel 58 is constrained with respect to the roll axis when both front gear are in ground contact, and is constrained with respect to the pitch axis when the tail wheel and either front gear are in ground contact.

Figure 2:
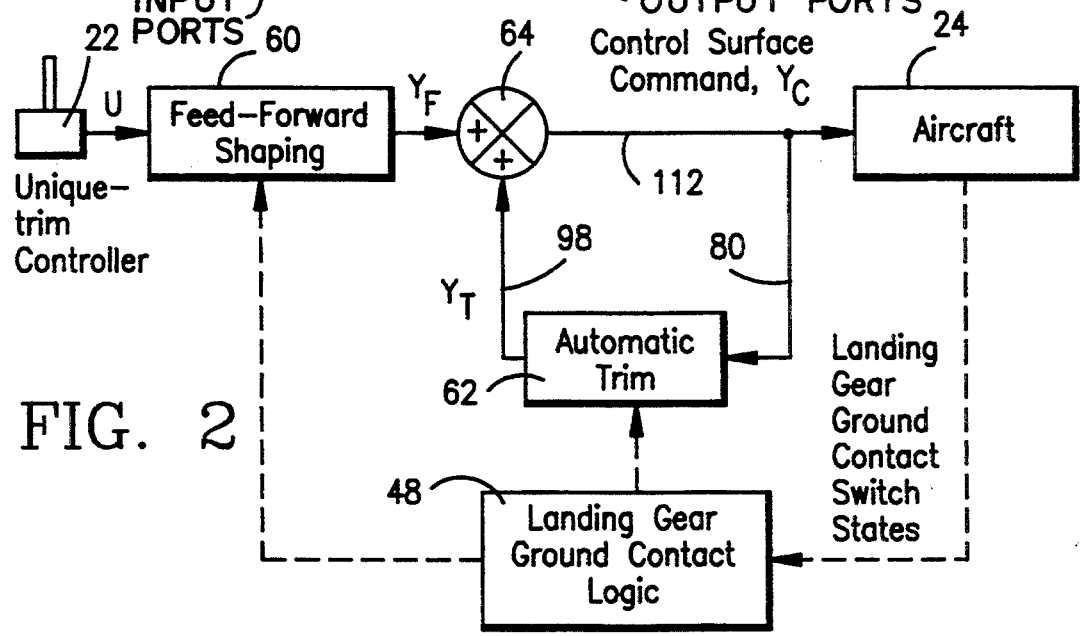
FIG. 2 is a schematic diagram showing an arrangement of feedforward shaping, automatic trim, an unique-trim controller and aircraft.

As shown in FIG. 2, a unique-trim, flight control system includes feedforward shaping 60, automatic trim 62, and landing gear ground contact logic 48, all of which may be software modules containing control algorithms stored in electronic memory that produce control surface commands $Y_C$ used to control the pitch, roll, and yaw axes and lift of the aircraft. The feedforward shaping is the primary command path and provides control quickening of pilot input U to the control system through use of controller 22. In an unique trim control system, steady-state controller inputs are integrated out by the automatic trim function 62 so that the cockpit controller returns to a unique, centered position during trimmed flight conditions.

Feedforward shaping output $Y_F$ and automatic trim output $Y_T$ are summed at summing junction 64 to produce control surface commands $Y_C$. The control is supplemented by landing gear ground contact logic 48, described above, to reconfigure the control law to support in-flight and ground operations.

Upon initial contact of any landing gear, the feedforward shaping is transitioned from unique-trim control of the fly state to proportional control for ground state operations. Proportional control connotes direct correlation between movement of the cockpit controls and resulting movement of the control surfaces, such as the swashplate of a helicopter rotor, i.e., each control surface moves a fixed amount for a given movement of the controller. With unique-trim control, the degree of control surface movement is related to the direction, displacement and duration of displacement of the controller, i.e., the position of the controller is integrated over time so that the unique-trim controller can center during trimmed flight conditions.

A fundamental objective is to produce a smooth transition between the fly state and ground state. No abrupt transients in feedforward gain should occur when the landing gear switches 36, 38, 40 toggle during a bouncy landing.

Figure 5:
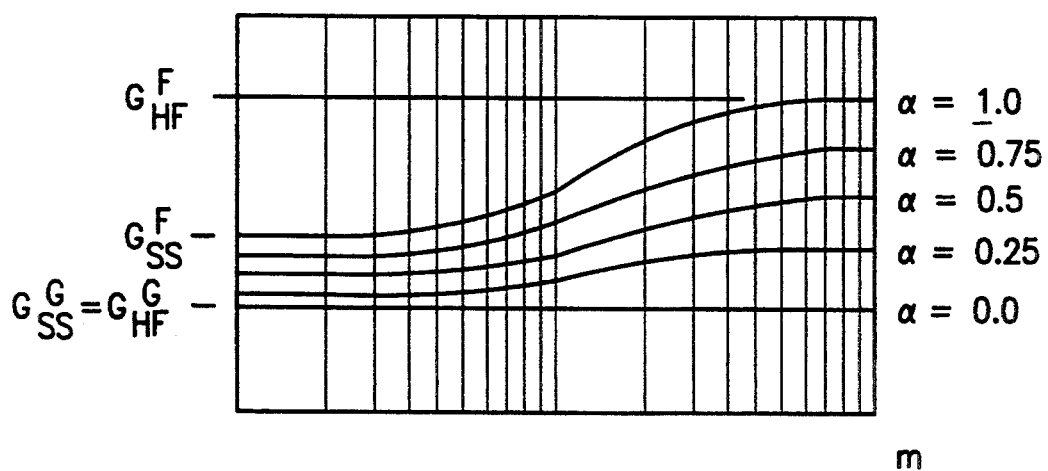
FIG. 5 is a graph showing the variation of feedforward gain with frequency over the range of ground contact.

As shown in FIG. 5, the fly state forward loop shaping is represented as a first order lead/lag filter having high frequency gain $G^F_{HF}$, and steady state gain $G^F_{SS}$. A transition variable $\alpha$ is assigned the value 1.0 in the fly state and, upon initial landing gear contact, $\alpha$ slowly acquires fractional values over an interval of about one second until its value is 0.0, representing the ground state. Proportional control is provided in the ground state; therefore $G^G_{HF}=G^G_{SS}$. As a transition between the fly state and ground state occurs, feedforward shaping is bounded by the ground state and fly state frequency response profiles set forth in FIG. 5.

Figure 6:
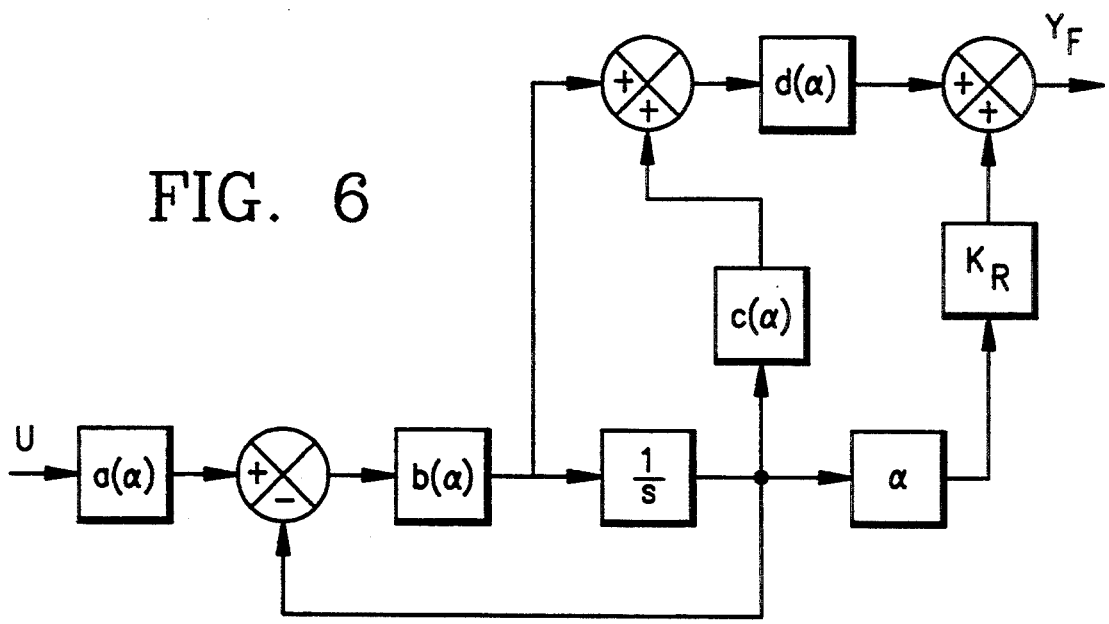
FIG. 6 is a schematic diagram of the generalized feedforward shaping function.

The feedforward shaping function 60, whose output $Y_F$ is constructed in accordance with the generalized technique of FIG. 6, essentially operates upon four parameters that are a function of the fly state-ground state transition variable $\alpha$. In the fly-state, each of these parameters has the specific meaning shown below:

$a(1.0)=K_F$, feedforward gain
$b(1.0)=\omega_n$, desired natural frequency
$c(1.0)=D_s$, the lead filter break frequency
$d(1.0)=D_c$, inverse control gain.

With reference to the feedforward shaping function of FIG. 6, s is the complex frequency variable, the Laplace transform operator.

In the fly state, the feedforward output $Y_F$, expressed in the Laplace domain in terms of the parameters and controller input U, is $$Y_F = \frac{K_F \omega_n [D_c s + (D_s D_c + K_R)]}{(s + \omega_n)} U$$

In terms of fly state high frequency gain, $G^F_{HF}$, and steady-state gain, $G^F_{SS}$, $$G^F_{SS} = \lim_{s \to 0} \frac{Y_F}{U} = K_F(D_s D_c + K_R)$$

$$G^F_{HF} = \lim_{s \to \infty} \frac{Y_F}{U} = K_F \omega_n D_c$$

Figure 4:
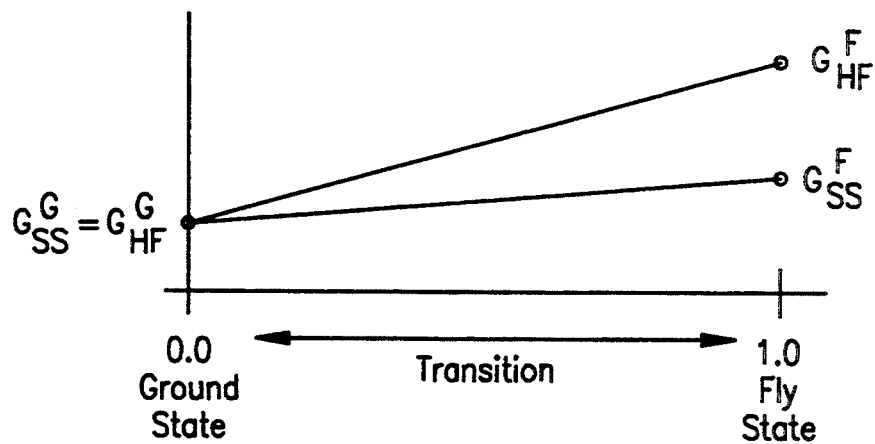
FIG. 4 is a graph showing the variation of feedforward steady state gain and high frequency gain over a ground state-fly state transition.

The feedforward shaping function 60 determines the feedforward shaping parameters as a function of the transition variable $\alpha$ such that the following requirements are satisfied: (1) proportional control is provided in the ground state i.e., when $\alpha=0$, then $G^G_{HF}=G^G_{SS}$; steady-state gain varies linearly with $\alpha$; and the difference between high frequency gain and steady-state gain varies linearly with $\alpha$. These criteria are illustrated in the graph of FIG. 4.

Upon imposing these requirements, $a(\alpha)=K_F$ $b(\alpha)=[\omega_n - G_{SS}^G/K_F D_c]\alpha + [G_{SS}^G/K_F D_c]$ $c(\alpha)=[D_s - G_{SS}^G/K_F D_c]\alpha + [G_{SS}^G/K_F D_c]$ $d(\alpha)=d_c$ The feedforward shaping output $Y_F$ is combined at summing junction 64 with automatic trim output $Y_T$, which is determined as described next.

Depending on the flight condition, the difference between the fly state trim condition and ground state trim condition can be quite large, especially for main and tail rotor collective pitch. The automatic trim function 62 transitions from its fly state trim value, produced when there is no ground contact, to a ground state trim value, produced when all landing gear are firmly contacting ground, via the following two transition states: (1) a partial ground state immediately following initial contact of any landing gear; and (2) a constrained degree-of-freedom state, wherein the aircraft is at least partially unresponsive to rotation about an axis due to ground contact of the landing gear straddling that axis. The technique for sequencing this transition is illustrated schematically in FIG. 7 and described next with reference to that figure.

Figure 7:
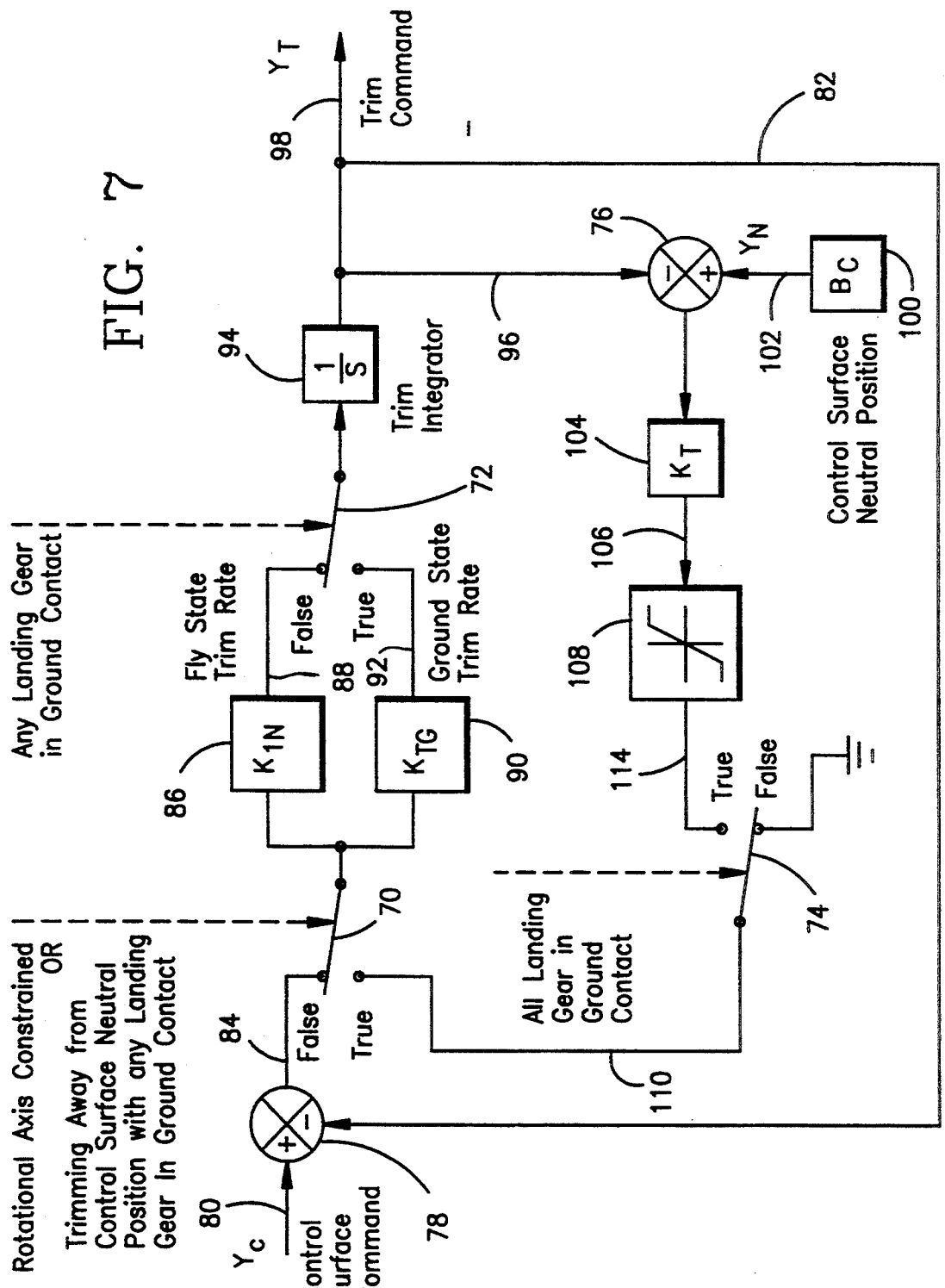
FIG. 7 is a schematic diagram of the automatic trim function.

Control logic of the automatic trim function, shown in FIG. 7, changes as the condition of several switches 70, 72, 74 changes in response to output produced by the landing gear ground contact logic 48. Switch 70 is in the true position if (1) a rotational axis is constrained by ground contact, or (2) the control is trimming away from the control surface neutral position and any landing gear is contacting ground. Otherwise, switch 70 is in the false position. The control is determined to be trimming away from the control surface neutral position if the output of summing junction 76 is increasing in absolute magnitude, i.e., increasing positively or negatively, and any landing is contacting ground. Switch 72 is in the true position if any landing gear contacts ground; otherwise switch 72 is in the false position. Switch 74 is in the false position when all landing gear contact ground; otherwise switch 74 is in the true position.

At summing junction 78, the trim rate difference between the control surface command $Y_C$ on line 80 and trim command $Y_T$ on line 82 is placed on line 84 and carried to a terminal of switch 70. That trim rate difference signal fed to fly state trim rate gain stage 86, where it is gained up at a relatively fast rate, gain $K_{TF}$, to produce a fly state trim rate signal on line 88. Alternately, if switch 70 is in the true position, the trim rate output from switch 70 is fed to ground state trim rate gain stage 90 where it is gained up at a relatively slower rate, gain $K_{TF}$, to produce a ground state trim rate signal on line 92. The trim rate signals on parallel lines 88, 92 are directed by switch 72 to trim integrator 94, which integrates out steady-state components of controller input U over time, thereby accommodating return of the controller to a unique, centered position during trimmed flight conditions.

The trim command $Y_T$ signal output from trim integrator 94 is carried on line 82 to summing junction 78, on line 96 to summing junction 76, and on line 98 to summing junction 64. Junction 64 determines the trim rate difference between trim command $Y_T$ and feedforward shaping command $Y_F$, and provides the control surface command $Y_C$, carried on line 80 to summing junction 78, and on line 28 from output ports 18 to the actuators 30 that alter the position or attitude of the respective control surfaces 32.

A neutral position $B_G$ associated with each control surface is stored in electronic memory at 100 with a corresponding neutral position command $Y_N$ signal, carried on line 102 to summing junction 76, which takes the difference between control surface neutral position command $Y_N$ and trim command $Y_T$ carried on line 96. This trim rate difference is fed to a neutral position gain stage 104, where it is amplified by neutral position control gain $K_T$. The resulting signal, carried on line 106, is limited by the rates set by limiter 108. In response to a signal produced by landing gear control logic 48 representing whether all the landing gear are in ground contact, switch 74 alternately connects limiter 108 output to line 110 or connects line 110 to ground, thereby placing a zero trim rate on line 110. The trim rate signal carried on line 110 is available for connection by switch 70 to parallel paths 88, 92.

Fly state Trim

In the fly state, a state determined by the landing gear ground contact logic 48 from input representing that no landing gear is contacting ground, the automatic trim function 62 accommodates centering of the unique-trim controller 22 during trimmed flight conditions. Under steady state flight conditions, the feedforward shaping command $Y_F$, produced as output by feedforward shaping function 60 is substantially zero. However, when control system input is changing, the control surface command, $Y_C$, is nonzero and contains high and low frequency components.

In response to signals representing the present state of ground contact produced by the sensors 36, 38, 40 mounted on the landing gear, the landing gear ground contact logic 48 effectively places switches 70, 72, 74 in their false positions. Summing junction 78 compares control surface command $Y_C$ and trim command $Y_T$, and that trim rate difference is passed by switch 70 to gain stage 86, where it is gained up at a fast rate to produce the fly state trim rate signal carried on line 88 to integrator 94, which removes the steady state trim by integrating the rate over time. The resultant trim command signal $Y_T$ is carried on line 82 to junction 78 and on line 28 to summing junction 64. At junction 64, the control surface command $Y_C$, the sum of the trim command $Y_T$ and feedforward shaping command $Y_F$, is placed on line 112, on which it is carried to the control surface actuators 30, which manipulate the control surfaces 32 in response to that command. Line 80 carries $Y_C$ to automatic trim junction 78.

Therefore, during steady, trimmed flight conditions, all of the control surface command $Y_C$ is commanded by the automatic trim function; steady state controller input is removed by integration.

Partial Ground State

The degree to which the aircraft is constrained and unresponsive to control surface commands increases as the extent of ground contact increases. For example, the aircraft becomes unresponsive to rotation about the yaw, pitch and roll axes in accordance with the location, with respect to the relevant axis, of the landing supporting the aircraft.

Testing of the aircraft, suitably equipped with its control system, control surfaces, and the associated actuation system, is conducted to determine a trim rate that is consistent with the extent to which the aircraft is constrained by ground contact, i.e., its ability to respond to control surface commands. The ground state trim rate, stored in electronic memory at 90 and accessible with reference to output from landing gear ground contact logic 48 representing the nature and extent of ground contact, reflects the empirical results of this testing. The ground state trim rate is compatible with the reduction in aircraft response due to the current output of ground contact logic 48.

In the partial ground state, a state recognized from input representing initial contact of any landing gear with ground, output produced by landing gear ground contact logic 48 effectively causes switch 72 to toggle to its true position and switches 70, 74 to remain in their false positions. The ground state trim rate is recalled from memory, provided the control is not trimming away from the control surface neutral position $B_G$. This toggling of switch 72 directs the output of summing junction 78, the difference between trim command $Y_T$ and control surface command $Y_C$, to ground state gain stage 90, which reduces the trim rate to a slow rate consistent with the reduction of aircraft response to control system input due to ground contact. Switch 72 directs the ground state trim rate to integrator 94. The output of trim integrator 94, trim command $Y_T$, is combined at summing junction 64 with the feedforward shaping command $Y_F$ produced by the feedforward shaping function 60, and the resultant, control surface command $Y_C$, is carried on lines 112, 80 to summing junction 78 for combination with trim command $Y_T$. Accordingly, the trim rate is reduced to a rate consistent with reduction of aircraft response to control system inputs.

However, if the absolute magnitude output from summing function 76 is increasing, either positively or negatively, then the control is attempting to trim away from the control surface neutral position $B_G$, represented by neutral position trim rate signal $Y_N$. Then switch 70 toggles to its true position, whereby it is connected to ground, a zero is placed on the inner loop of the automatic trim function 62. Therefore, while the control is trimming away from $B_G$, the time rate of change of the trim command $Y_T$ is zero and changes in control surface command $Y_C$ equal changes in feedforward shaping command $Y_F$.

Constrained Rotational Degree of Freedom

As the aircraft rotational degrees of freedom, i.e., rotation about the pitch, roll and yaw axes, become increasingly constrained by ground contact, the pilot's ability to monitor the magnitude of the control system command by sensing aircraft response diminishes. Therefore, in a constrained rotational degree of freedom state, a state determined by landing gear ground contact logic from input representing at least two landing gear contacting ground and straddling a axis of rotation, the trim rate is zero with respect to an aircraft variable corresponding to that axis.

In the constrained rotational degree of freedom state, output from landing gear ground contact logic 48 effectively causes switches 70, 72 to toggle to their true positions and switch 74 to remain in its false position. With the automatic trim function so disposed, a zero is placed on the loop that includes line 110, ground state trim rate gain 90, integrator 94, and line 82. Trim command $Y_T$ is zero, and the feedforward shaping command $Y_F$ is passed without change to command the corresponding aircraft control surface response. Consequently, changes in control surface command $Y_C$ are proportional to cockpit controller inputs U.

Ground State Trim

Proportional control is provided in the ground state. Contrary to conventional displacement controls, unique-trim controller 22 provides no tactile feedback to the pilot regarding the attitude or disposition of the control surface. Therefore, while operating the aircraft in the ground state, the automatic trim function 62 gradually defaults to a trim command that is the neutral control surface command $Y_N$ corresponding to the control surface neutral position $B_G$. This action occurs over an interval in response to output produced by the landing gear ground contact logic 48 indicating that all landing gear firmly contact ground. The pilot controls the rotor in the ground state relative to the neutral control surface position. In this way, the pilot receives a continual indication of absolute rotor attitude knowing the rotor will return to a unique attitude (the neutral position) upon release of controller forces.

In the full ground state, output from ground contact logic 48 effectively causes switches 70, 72, 74 to toggle to their true positions, recalls from memory 14 the control surface neutral position $B_G$ corresponding to the aircraft variable or degree of freedom, and places the corresponding control surface neutral position rate $Y_N$ at subtracter 76. The output of subtracter 76 is fed to neutral position gain stage 104. The resulting trim rate, on line 114, is limited to the rates set by limiter 108. Switches 70, 72, 74 connect the output of limiter 108 to ground state trim rate 90 and integrator 94, whose output, trim command $Y_T$, is subtracted from $Y_N$ at subtracter 76. Therefore, the inner loop operates to re-reference trim command $Y_T$ gradually to the neutral control surface command $Y_N$.

At summing junction 64, trim command $Y_T$ is combined with feedforward shaping command $Y_F$ producing control surface command $Y_C$, to which the relevant control surface actuators 30 respond and move the control surfaces 32. Consequently, after each transition to the full ground state, a unique relationship between the position of the cockpit controller and control surface command results.

Although the invention is illustrated and described with reference to a helicopter having a microprocessor-based control system, the invention is neither limited to use with a microprocessor nor to a helicopter. Instead, the invention may be carried out with discrete digital or analog electronic components, and it can be applied to control a fixed-wing aircraft having control surfaces adapted to control roll, pitch, yaw heading and lift.

I claim:

1. A system for controlling an aircraft, having landing gear and defining a pitch axis, a roll axis, a yaw axis and a lift axis, during a transition between a fly state, when no landing gear contact ground, and a ground state, when landing gear contact ground, comprising:

controller means for producing a control input representing a desired value of an aircraft variable, wherein said aircraft variable comprises at least one of attitude with respect to the pitch axis, attitude with respect to the roll axis, heading with respect to the yaw axis, and altitude with respect to the lift axis;

sensing means responsive to the landing gear for providing sensor signals representing whether each landing gear contacts ground;

landing gear ground contact means responsive to said sensor signals for producing signals indicating aircraft operation in the fly state and ground state;

feedforward shaping means responsive to signals from said landing gear ground contact means and said control input, for developing a feedforward command that changes during the transition between the fly state and ground state, the feedforward command being proportional to said control input in the ground state and having a predetermined frequency dependent response profile in the fly state;

summing junction means for combining the feedforward command and a trim command, and for producing therefrom a control surface command; and automatic trim means responsive to signals from said landing gear ground contact means and said control surface command for producing a trim command, for removing the effect of steady-state control input from the control surface command when operating in the fly state, and for producing a control surface neutral position command during operation in the ground state with all landing gear in ground contact.

2. The system of claim 1, wherein the feedforward shaping means comprises:

means responsive to said sensor signals for developing a transition variable, whose magnitude changes over a predetermined interval from a first value corresponding to initial ground contact of the landing gear to a second value at the end of said predetermined intervals; and a first order lead/lag filter responsive to said sensor signals, transition variable and control input, having high frequency gain and steady-state gain that vary with the magnitude of said transition variable, having steady-state gain and a difference between the high frequency gain and steady-state gain that vary linearly with said transition variable, and producing a feedforward command that is independent of frequency during operation in the ground state.

3. The system of claim 2 wherein the feedforward command output $Y_F$ of the filter in the fly state is $$Y_F = \frac{K_F \omega_n [D_c s + (D_s D_c + K_R)]}{(s + \omega_n)} * U$$

wherein, U is the control input U, $K_F$ is feedforward gain, $\omega_n$ is the desired natural frequency, $D_S$ is the lead filter break frequency, $D_c$ is the inverse control gain, $K_R$ is the lead ratio gain, and s is the complex frequency variable.

4. The system of claim 1 further comprising:
means for producing said control surface neutral position command;
means for determining and indicating whether the trim command is trimming toward the control surface neutral position; and
wherein the automatic trim means further produces a time rate of change of said trim command that is nonzero only if said trim command is trimming toward a control surface neutral position.

5. The system of claim 1, wherein the landing gear ground contact means further serves for indicating constraint of the aircraft's ability to respond to control input due to ground contact, the system further comprising:
means responsive to indication from landing gear ground contact means for producing a trim command that is compatible with a reduction in aircraft response to control input due to ground contact; and
where said automatic trim means further produces a trim command that is compatible with a reduction in aircraft response to control input due to ground contact.

6. The system of claim 1 wherein;
said landing gear ground contact means further serves for indicating constraint of the aircraft's ability to respond to control input due to ground contact; and
said automatic trim means further produces a time rate of change of said trim command that is zero if a rotational axis is constrained due to ground effect.

7. A system for controlling an aircraft, having landing gear and defining a pitch axis, a roll axis, a yaw axis and a lift axis, during a transition between a fly state, when no landing gear contact ground, and a ground state, when landing gear contact ground, comprising:
controller means for producing a control input representing a desired value of an aircraft variable, wherein said aircraft variable comprises at least one of attitude with respect to the pitch axis, attitude with respect to the roll axis, heading with respect to the yaw axis, and altitude with respect to the lift axis;
sensing means responsive to the landing gear for providing sensor signals corresponding to the condition of each landing gear and representing whether each landing gear contacts ground;
landing gear ground contact means responsive to said sensor signals for producing signals indicating aircraft operation in the fly state and ground state;
means responsive to said sensor signals for developing a transition variable, whose magnitude changes over a predetermined interval from a first value corresponding to initial ground contact of the landing gear to a second value at the end of said predetermined interval; and
feedforward shaping filter means responsive to said transition variable, signals from said landing gear ground contact means and said control input, for developing a feedforward command whose frequency response changes during said transition as a function of said transition variable magnitude, the feedforward command having the frequency response of a lead/lag filter in the fly state, having a response that is independent of frequency in the ground state, and having a frequency response that changes with said transition variable magnitude during the transition between these states;
a first summing junction for combining the feedforward command and a trim command, and for producing therefrom a control surface command; and
automatic trim means responsive to signals from said landing gear ground contact means and said control surface command for producing a trim command, for removing by integrating over time the effect of steady-state control input from the control surface command when operating in the fly state, and for producing a control surface neutral position command during operation in the ground state with all landing gear in ground contact.

8. The system of claim 7, wherein the feedforward shaping filter means comprises:
a first order, lead/lag filter responsive to said sensor signals, transition variable and control input, having high frequency gain and steady state gain that vary with the magnitude of the transition variable during the transition, having steady-state gain and a difference between the high frequency gain and steady state gain that vary linearly with the transition variable, and producing a feedforward command that is independent of frequency during operation in the ground state.

9. The system of claim 7 wherein the feedforward command output $Y_F$ of the lead/lag filter during operation in the fly state is $$Y_F = \frac{K_F \omega_n [D_c s + (D_s D_c + K_R)]}{(s + \omega_n)} * U$$

wherein, U is the control input U, $K_F$ is feedforward gain, $\omega_n$ is the desired natural frequency, $D_S$ is the lead filter break frequency, $D_c$ is the inverse control gain, $K_R$ is the lead ratio gain, and s is the complex frequency variable.

10. The system of claim 9 wherein, during the transition, $$\omega_n(\alpha) = [\omega_n - G_{SS}{}^G/K_F D_c]\alpha + [G_{SS}{}^G/K_F D_c]$$

and $$D_S(\alpha) = [D_S - G_{SS}{}^G/K_F D_c]\alpha + [G_{SS}{}^G/K_F D_c]$$

wherein $\alpha$ is the transition variable and $G_{SS}{}^G$ is the steady state gain of the feedforward shaping command corresponding to ground state.

11. The system of claim 7 further comprising:
means for producing the control surface neutral position command;
means for determining and indicating whether said trim command is trimming toward the control surface neutral position; and wherein the automatic trim means further produces a trim rate of change of said trim command that is nonzero only if said trim command is trimming toward a control surface neutral postion.

12. The system of claim 7 wherein said landing gear contact means serves for indicating constraint of the aircraft's ability to respond to control input due to ground contact, the system further comprising:
   means responsive to indication from said landing gear contact means for producing a trim command that is compatible with a reduction in aircraft response to control input due to ground contact; and wherein said automatic trim means further produces a trim command that is compatible with a reduction in aircraft response to control input due to ground contact.

13. The system of claim 7 wherein;
said landing gear contact means further serves for indicating constraint of the aircraft's ability to respond to control input due to ground contact; and
said automatic trim means further produces a time rate of change of said trim command that is zero if a rotational axis is constrained due to ground contact.

* * * * *